(12) United States Patent
Morishita

(10) Patent No.: US 8,600,199 B2
(45) Date of Patent: Dec. 3, 2013

(54) OPTICAL MODULATOR AND OPTICAL MODULATING METHOD

(75) Inventor: Tsuyoshi Morishita, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 193 days.

(21) Appl. No.: 13/192,601

(22) Filed: Jul. 28, 2011

(65) Prior Publication Data

US 2012/0087617 A1 Apr. 12, 2012

(30) Foreign Application Priority Data

Oct. 8, 2010 (JP) ................................. 2010-229034

(51) Int. Cl.
*G02F 1/035* (2006.01)
*G02B 6/42* (2006.01)
*G02B 6/26* (2006.01)

(52) U.S. Cl.
USPC ........ 385/3; 385/2; 385/45; 385/50; 398/188; 398/198

(58) Field of Classification Search
USPC ............ 385/1–9, 24, 31–32, 45, 50; 398/188, 398/192, 195, 198
See application file for complete search history.

(56) References Cited

U.S. PATENT DOCUMENTS

2007/0177882 A1* 8/2007 Akiyama ...................... 398/185
2010/0080571 A1 4/2010 Akiyama et al.

FOREIGN PATENT DOCUMENTS

| JP | 2006-251087 | 9/2006 |
| JP | 2010-081287 | 4/2010 |
| JP | 2010-204689 | 9/2010 |

* cited by examiner

*Primary Examiner* — Michelle R Connelly
*Assistant Examiner* — Michael Mooney
(74) *Attorney, Agent, or Firm* — Fujitsu Patent Center

(57) ABSTRACT

An optical modulator includes a modulator that modulates an input light of light by using an input signal. The optical modulator further includes a compensation circuit that compensates the phase of a signal light in accordance with an input current, the signal light being the input light modulated by the modulator. The optical modulator further includes a detector that detects the difference between the phase of the signal light compensated by the compensation circuit and the phase of an input signal that is input to the modulator. The optical modulator further includes an adjustment circuit that adjusts, in accordance with the phase difference detected by the detector, the input current that is input to the compensation circuit.

6 Claims, 12 Drawing Sheets

OPTICAL MODULATOR AND OPTICAL MODULATING METHOD

CROSS-REFERENCE TO RELATED APPLICATION

This application is based upon and claims the benefit of priority of the prior Japanese Patent Application No. 2010-229034, filed on Oct. 8, 2010, the entire contents of which are incorporated herein by reference.

FIELD

The embodiments discussed herein are directed to an optical modulator and an optical modulating method.

BACKGROUND

In recent years, with the increase in telecommunications traffic, high-speed optical transmission systems have been requested. High-speed optical transmission systems preferably use an optical modulator that can modulate light at high speed.

A typical optical modulator includes a modulator that modulates light that is emitted from a light source by using a received data-signal. The modulator is made of, for example, dielectrics, such as LiNbO3 (LN), or semiconductors, such as InP and GaAs. The modulator splits a light emitted from the light source into a first light and a second light, guides the first light to a first waveguide and the second light to a second waveguide, and then superposes a data signal on the first light and a data signal on the second light. When data signals are respectively superposed on the first light and the second light, respective synthesized signal lights are generated and the optical signals are then output from the first waveguide and the second waveguide, respectively.

Being subjected to, for example, a temperature change and a temporal change (hereinafter, "temporal change, etc."), the phase of a signal light output from the first waveguide and/or the phase of a signal light output from the second waveguide may have changed from their respective target values. Any phase change degrades the waveform of an optical signal output from the modulator. An optical signal that has a degraded waveform decreases the transmission performance of the optical transmission device that transmits the optical signal.

Various technologies are considered to compensate a phase that has changed from a target value due to a temperature change, etc., (hereinafter, "phase degradation"). A well-known technology, for example, involves detecting the difference between the phase of a data signal that is superposed while passing through a waveguide and the phase of the signal light output from the waveguide and then adjusting the bias voltage that is applied to the waveguide in such a manner that the detected phase difference becomes zero. As described above, it is possible to decrease the extent of phase degradation caused by a temperature change, etc., by adjusting the bias voltage applied to the waveguide.

Patent Document 1: Japanese Laid-open Patent Publication No. 2006-251087
Patent Document 2: Japanese Laid-open Patent Publication No. 2010-081287

However, the conventional bias-voltage adjusting technology has a problem in that, if the modulator is made of a semiconductor, the power of the optical signal output from the modulator decreases.

The above problem is described with reference to FIG. 13. FIG. 13 is a graph that illustrates the properties of a Mach-Zehnder optical modulator that is made of a semiconductor. The horizontal axis of FIG. 13 is the bias voltage applied to the semiconductor Mach-Zehnder optical modulator; the vertical axis is the phase and the optical absorption (absorption). A curve 11 of FIG. 13 indicates the phase property of the semiconductor Mach-Zehnder optical modulator; a curve 12 indicates the absorption property of the semiconductor Mach-Zehnder optical modulator.

The phase property curve 11 of FIG. 13 can shift to a curve 13 due to a temperature change, a temporal change, etc. To compensate a change in the phase property, i.e., phase degradation, according to the conventional technology, the bias voltage that is applied to the waveguide of the semiconductor Mach-Zehnder optical modulator is increased from a default value $V_0$ to $V_1$.

The absorption property of the semiconductor Mach-Zehnder optical modulator indicated by the curve 12 increases as the bias voltage increases. In the example of FIG. 13, when the bias voltage is increased from $V_0$ to $V_1$, the absorption increases from $A_0$ to $A_1$. An increase in the absorption causes a light loss through the waveguide, which decreases the power of the optical signal output from the semiconductor Mach-Zehnder optical modulator.

SUMMARY

According to an aspect of an embodiment of the invention, an optical modulator includes a modulator that modulates an input light using an input signal; a compensation circuit that compensates a phase of a signal light in accordance with an input current, the signal light being the input light modulated by the modulator; a detector that detects a difference between the phase of the signal light compensated by the compensation circuit and a phase of an input signal that is input to the modulator; and an adjustment circuit that adjusts, in accordance with the phase difference detected by the detector, the input current that is input to the compensation circuit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The technology disclosed herein is not limited to the following embodiments.

[a] First Embodiment

An optical modulating method performed by an optical modulator 100 is described according to the first embodiment. The optical modulator 100 according to the first embodiment modulates, by using a modulator, a light emitted from a light source using a data signal that is input to the modulator. The modulator is made of a semiconductor, such as InP and GaAs.

The optical modulator 100 compensates, by using a phase shifter, the phase of a signal light in accordance with an input current that is input to the phase shifter, the signal light being light that is emitted from the light source and then modulated by the modulator. The phase shifter contains a material whose refractive index varies depending on the input current and shifts the phase of a signal light by using a change in the refractive index that varies according to a change in the input current, thereby compensating the phase of a signal light.

After that, the optical modulator 100 detects the difference between the phase of a signal light that is output from the phase shifter and the phase of a data signal that is input to the modulator. The optical modulator 100 then adjusts the input current that is input to the phase shifter in accordance with the detected phase difference.

Figure 1:
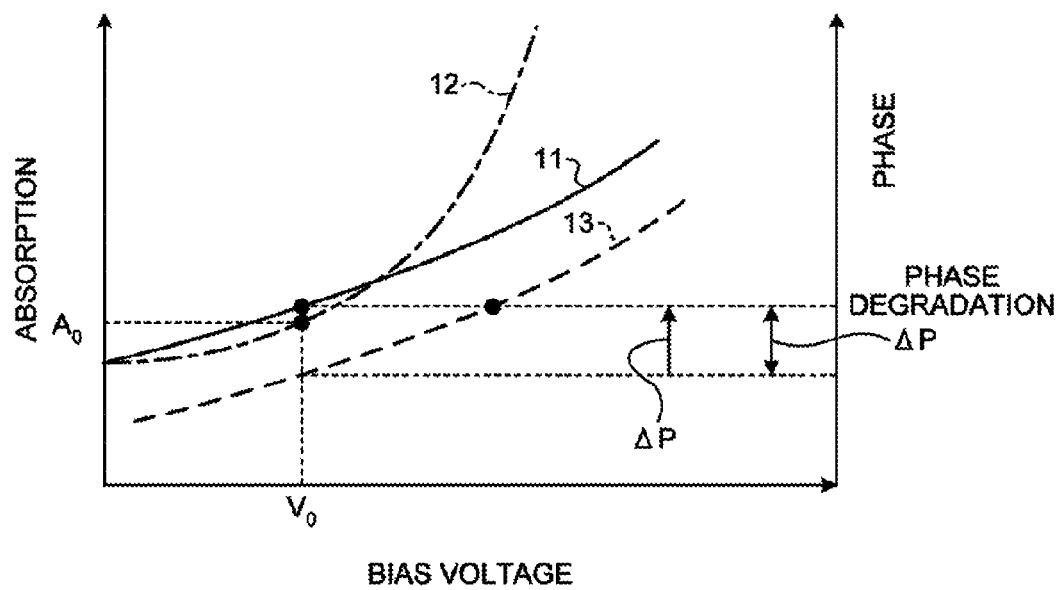
FIG. 1 is a graph that illustrates an optical modulating method performed by an optical modulator according to the first embodiment.
Figure 13:
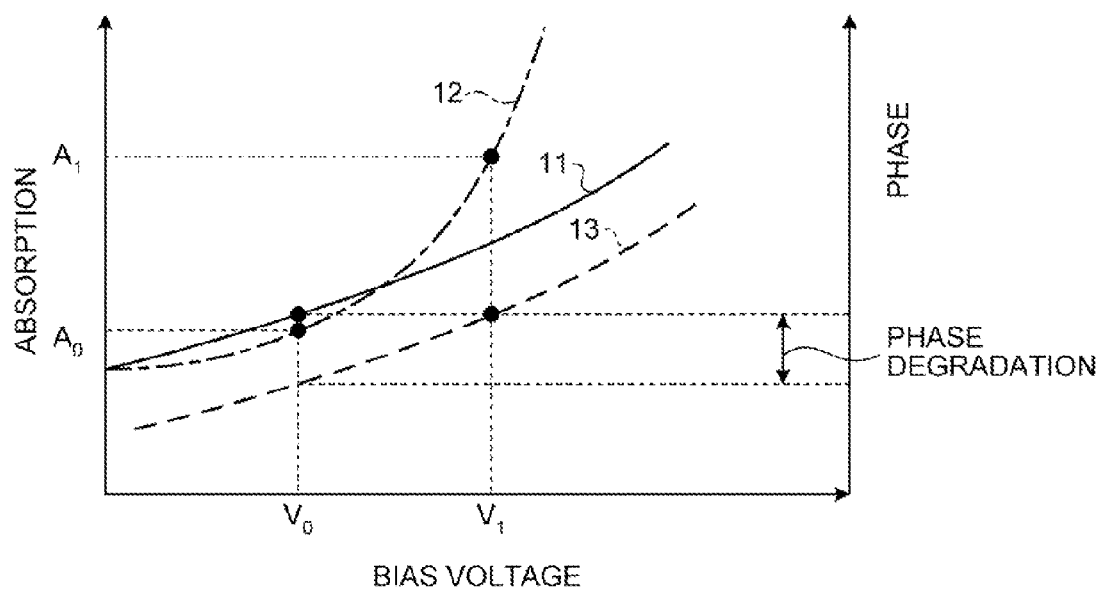
FIG. 13 is a graph that illustrates properties of a Mach-Zehnder optical modulator that is made of a semiconductor.

An example of the optical modulating method performed by the optical modulator 100 is described according to the first embodiment. FIG. 1 is a graph that illustrates the optical modulating method performed by the optical modulator 100 according to the first embodiment. FIG. 1 illustrates properties of the optical modulator 100 according to the first embodiment. A curve 11 of FIG. 1 corresponds to the curve 11 illustrated in FIG. 13. The curve 11 indicates a phase property of the modulator included in the optical modulator 100. A curve 12 of FIG. 1 corresponds to the curve 12 illustrated in FIG. 13 and indicates an optical absorption of the modulator included in the optical modulator 100.

The phase property indicated by the curve 11 of FIG. 1 can shift to the state indicated by a curve 13 due to a temperature change, a temporal change, etc. In order to detect the change in the phase property, i.e., phase degradation ΔP illustrated in FIG. 1, the optical modulator 100 detects the difference between the phase of a signal light that is output from the phase shifter and the phase of a data signal that is input to the modulator. The optical modulator 100 then adjusts the input current that is input to the phase shifter in accordance with the detected phase difference. Thus, the phase shifter compensates the phase of a signal light in accordance with the input current.

Figure 2:
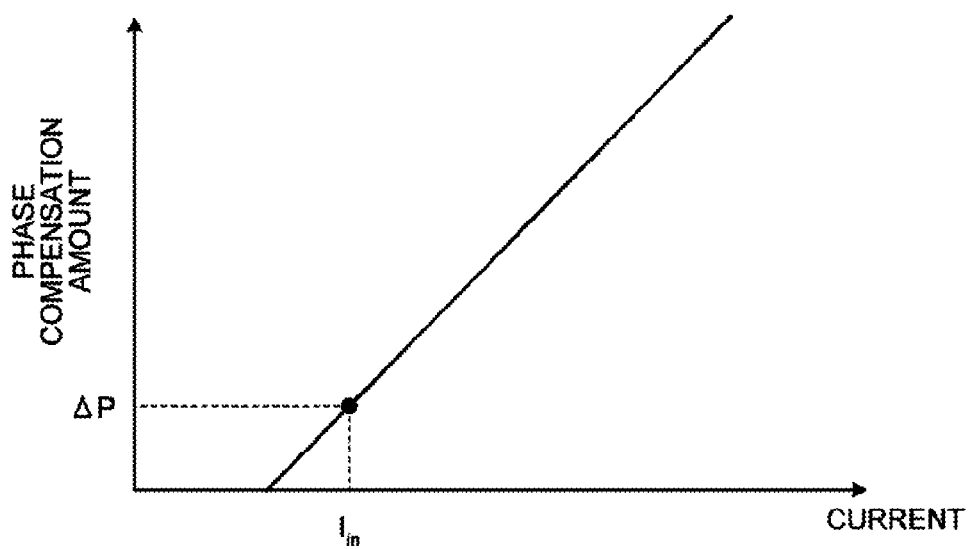
FIG. 2 is a graph that illustrates phase compensation performed by a phase shifter.

FIG. 2 is a graph that illustrates phase compensation performed by the phase shifter. The horizontal axis of FIG. 2 is the input current (current); the vertical axis of FIG. 2 is the phase compensation amount. As illustrated in FIG. 2, the phase shifter shifts the phase of a modulated signal in accordance with input current $I_{in}$, by an amount that corresponds to the phase degradation ΔP illustrated in FIG. 1, thereby compensating the phase of a signal light. Therefore, the optical modulator 100 can compensate the phase degradation ΔP with the bias voltage that is applied to the modulator being fixed to the default $V_0$ and can maintain the absorption of the modulator at $A_0$. Consequently, the optical modulator 100 can reduce a light loss occurring through the modulator.

As described above, the optical modulator 100 according to the first embodiment compensates the phase of a signal light by using the phase shifter. The optical modulator 100 then detects the difference between the phase of a signal light that is output from the phase shifter and the phase of a data signal that is input to the modulator. After that, the optical modulator 100 adjusts, in accordance with the detected phase difference, the input current that is input to the phase shifter. With this configuration, the optical modulator 100 can compensate phase degradation without increasing or decreasing the bias voltage that is applied to the modulator. As a result, the optical modulator 100 prevents an increase in the absorption of the modulator due to an increase/decrease in the bias voltage; therefore, even if a modulator made of a semiconductor is used, the decrease in the power of the optical signal output from the modulator is reduced.

Figure 3:
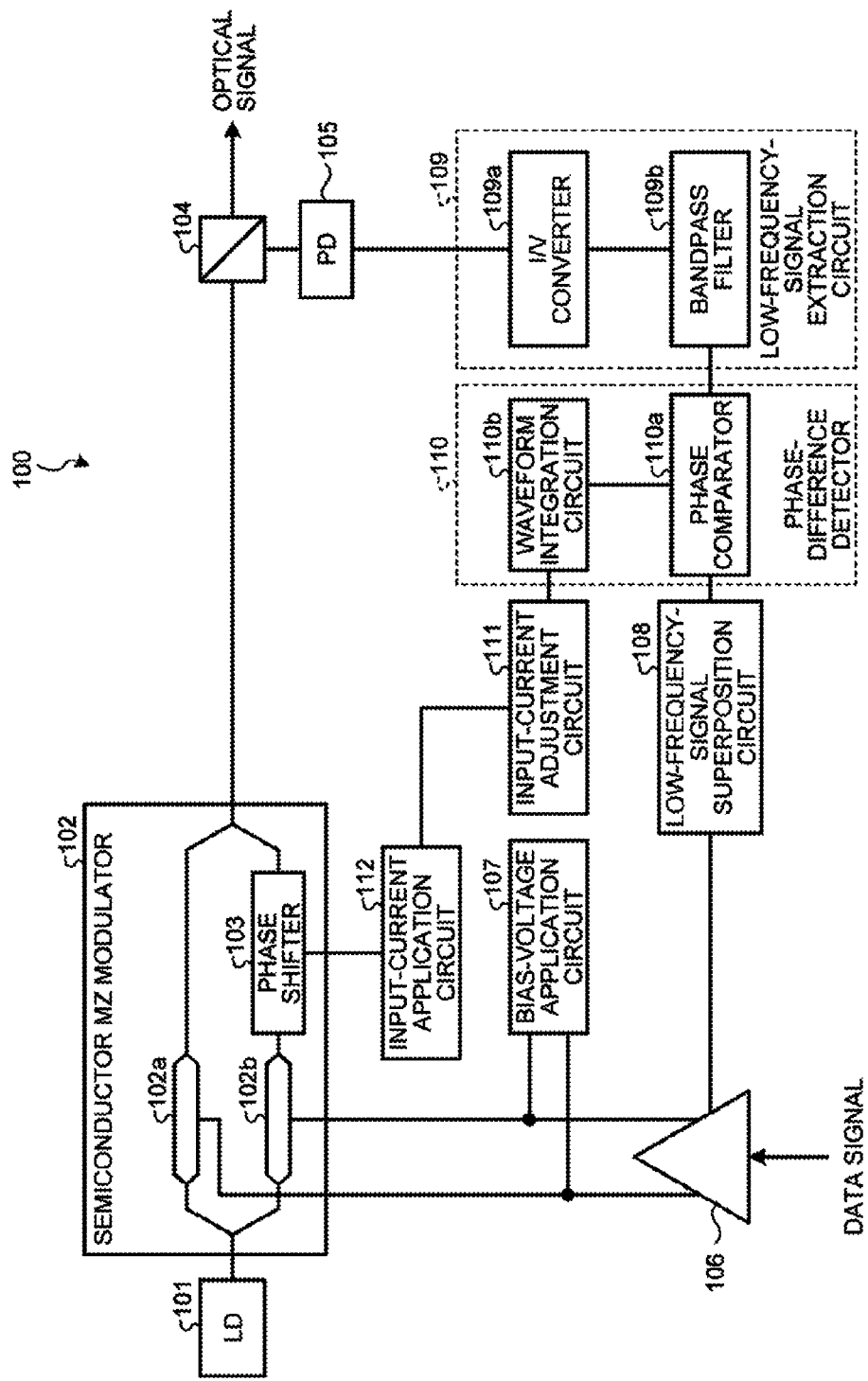
FIG. 3 is a block diagram of the configuration of the optical modulator according to the first embodiment.

The configuration of the optical modulator 100 is described below according to the first embodiment. FIG. 3 is a block diagram of the configuration of the optical modulator 100 according to the first embodiment. As illustrated in FIG. 3, the optical modulator 100 includes a laser diode (LD) 101, a semiconductor Mach-Zehnder (MZ) modulator 102, a phase shifter 103, an optical coupler 104, and a photo detector (PD) 105.

The optical modulator 100 further includes a driver 106, a bias-voltage applying circuit 107, a low-frequency-signal superposition circuit 108, a low-frequency-signal extracting circuit 109, a phase-difference detecting circuit 110, an input-current adjusting circuit 111, and an input-current applying circuit 112. The semiconductor MZ modulator 102 includes a first waveguide 102a and a second waveguide 102b. The phase shifter 103 is arranged at the output side of the second waveguide 102b.

The LD 101 is a light source that emits light having a predetermined wavelength (hereinafter, "source light"). The semiconductor MZ modulator 102 is a semiconductor Mach-Zehnder interferometer that contains a semiconductor, such as InP and GaAs, as a material. The semiconductor MZ modulator 102 modulates the intensity of the light emitted from the LD 101. More particularly, the source light is input to the semiconductor MZ modulator 102 and then split into two lights. A first light of source light is output to the first waveguide 102a and a second light of source light is output to the second waveguide 102b. The first waveguide 102a superposes a data signal that is received from the driver 106 on the first light of source light, thereby modulating the first light of source light. The second waveguide 102b superposes a data signal that is received from the driver 106 on the second light of source light, thereby modulating the second light of source light. After that, the signal light that is output from the first waveguide 102a is combined with the signal light that is output from the second waveguide 102b and then output from the phase shifter 103 and thus an intensity-modulated optical signal is generated. Because, as described later, a data signal that is output from the driver 106 contains a low-frequency signal superposed thereon by the low-frequency-signal superposition circuit 108, the low-frequency signal appears on the H side and the L side of the generated optical signal as envelope-shaped low frequency components.

The phase of a signal light output from the first waveguide 102a and the phase of a signal light output from the second waveguide 102b, both combined together by the semiconductor MZ modulator 102, are set to their respective target values and the difference between the phases is preferably 7c. However, the phase of a signal light output from the first waveguide 102a and/or the phase of a signal light output from the second waveguide 102b may have changed from their respective target values. Change in the phase away from the target value, i.e., phase degradation is caused by, for example, a temperature change or a temporal change of the semiconductor MZ modulator 102. The phase degradation degrades the waveform of an optical signal that is output from the semiconductor MZ modulator 102, which decreases the performance of transmitting the optical signal.

The phase shifter 103 compensates the phase of a signal light in accordance with the input current received from the input-current applying circuit 112. More particularly, the phase shifter 103 contains a material whose refractive index varies depending on the input current. The phase shifter shifts the phase of a signal light output from the second waveguide 102b by using a change in the refractive index that varies according to a change in the input current received from the input-current applying circuit 112, thereby shifting the phase of the signal light output from the second waveguide 102b, i.e., compensating the phase of the signal light. For example, the phase shifter 103 shifts, in accordance with the input current received from the input-current applying circuit 112, the phase of a signal light by the amount that corresponds to the phase degradation of the semiconductor MZ modulator 102, thereby compensating the phase of a signal light. The phase shifter 103 is an example of a compensation circuit.

The optical coupler 104 splits an optical signal output from the semiconductor MZ modulator 102 into two and outputs one as an output signal and the other to the PD 105. The PD 105 converts the optical signal received from the optical coupler 104 into an electric signal.

Upon receiving a data signal from an external device, the driver 106 outputs the data signal to both the first waveguide 102a and the second waveguide 102b of the semiconductor MZ modulator 102. The bias-voltage applying circuit 107 applies a bias voltage to the data signal output from the driver 106. The applied bias voltage has the bias point fixed to a predetermined value.

The low-frequency-signal superposition circuit 108 generates a low frequency pilot signal (hereinafter, "low-frequency signal") and superposes the generated low-frequency signal on a data signal that is output from the driver 106. Moreover, the low-frequency-signal superposition circuit 108 outputs the generated low-frequency signal to the phase-difference detector 110. A low-frequency signal superposed on a data signal by the low-frequency-signal superposition circuit 108, herein, can be called as "superposed low-frequency signal".

The low-frequency-signal extracting circuit 109 extracts a low-frequency signal from an electric signal that is received from the PD 105. More particularly, the low-frequency-signal extracting circuit 109 includes an I/V converter 109a and a bandpass filter 109b. The I/V converter 109a converts a current value of an electric signal that is received from the PD 105 into a voltage value.

The bandpass filter 109b extracts a low-frequency signal from the electric signal that has been converted into the voltage value by the I/V converter 109a. More particularly, the bandpass filter 109b filters out any high frequency components from the voltage value generated by the I/V converter 109a and allows only low frequency components to pass therethough, and then calculates the average time of the passed frequency components, thereby extracting a low-frequency signal. The bandpass filter 109b outputs the extracted low-frequency signal (hereinafter, "extracted low-frequency signal") to the phase-difference detector 110.

Figure 4:
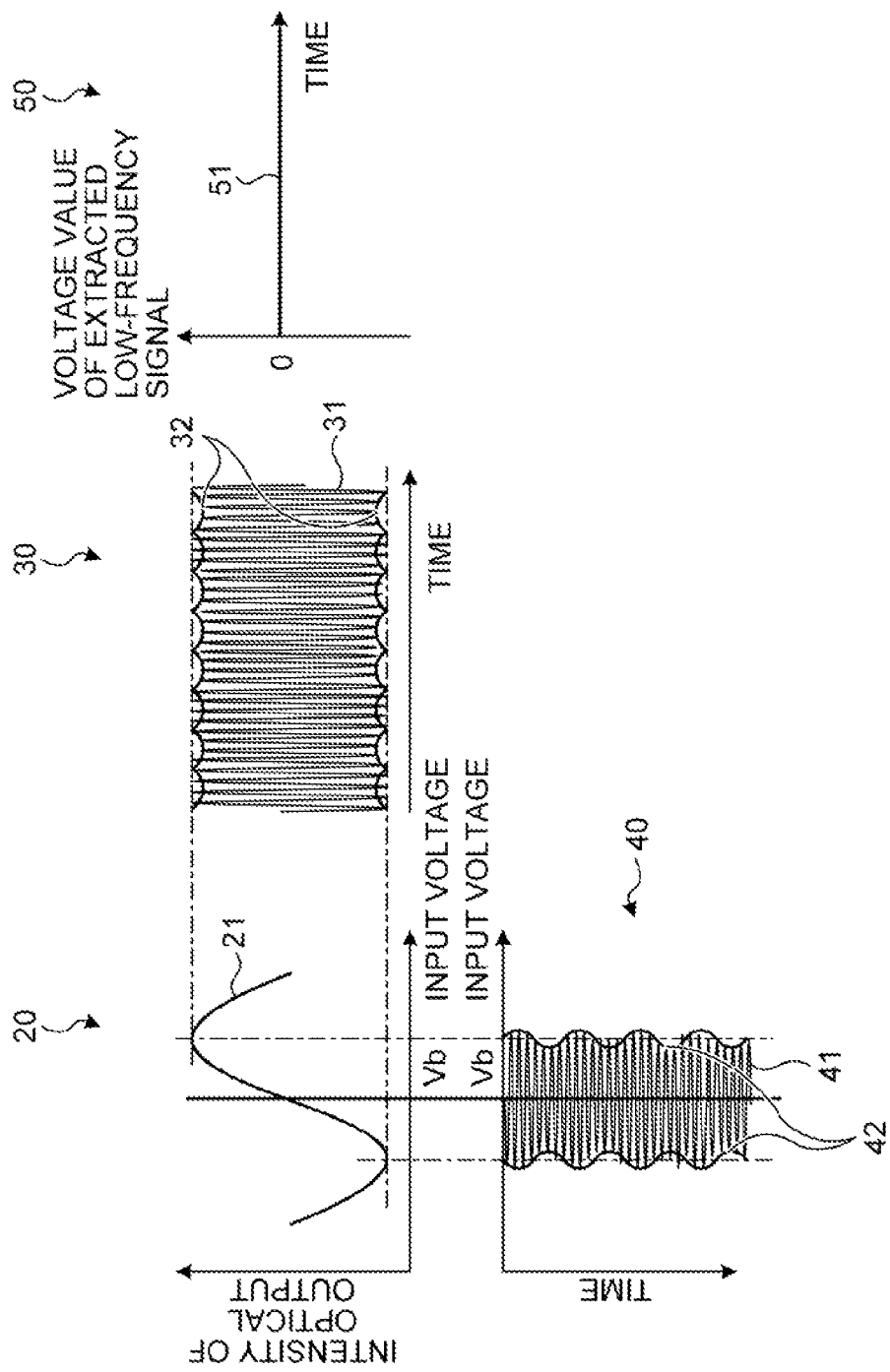
FIG. 4 is a set of graphs that illustrates the relation between a data signal that is input to the semiconductor MZ modulator and an optical signal that is output from the semiconductor MZ modulator when no phase degradation occurs in the semiconductor MZ modulator according to the first embodiment.

The processes performed by the low-frequency-signal extraction circuit 109 are described in concrete terms with reference to the following situations: where no phase degradation occurs in the semiconductor MZ modulator 102 and where phase degradation occurs. The relation between a data signal that is input to the semiconductor MZ modulator 102 and an optical signal that is output from the semiconductor MZ modulator 102 is described under a situation where no phase degradation occurs in the semiconductor MZ modulator 102. FIG. 4 is a set of graphs that illustrates the relation between a data signal that is input to the semiconductor MZ modulator 102 and an optical signal that is output from the semiconductor MZ modulator 102 when no phase degradation occurs in the semiconductor MZ modulator 102 according to the first embodiment. FIG. 4 includes graphs 20, 30, 40, and 50.

The horizontal axis of the graph 20 is the voltage (bias voltage) of a data signal input to the semiconductor MZ modulator 102, the vertical axis is the power of an optical signal output from the semiconductor MZ modulator 102. A curve 21 indicates the permeability property of the semiconductor MZ modulator 102. The horizontal axis of the graph 30 is the time and the vertical axis is the power of an optical signal output from the semiconductor MZ modulator 102. The horizontal axis of the graph 40 is the voltage (bias voltage) of a data signal input to the semiconductor MZ modulator 102, and the vertical axis is the time. The horizontal axis of the graph 50 is the time, and the vertical axis is the voltage value of an extracted low-frequency signal.

If a data signal 41 (data signal output from the driver 106) is input to the semiconductor MZ modulator 102 that has the permeability property indicated by the curve 21 of the graph 20, an optical signal 31 indicated by the graph 30 is output from the semiconductor MZ modulator 102. The bias voltage of the data signal 41 is fixed to a voltage Vb that corresponds to the acutest angle of the curve 21 indicative of the permeability property. Because the data signal 41 contains a low-frequency signal 42 superposed thereon by the low-frequency-signal superposition circuit 108, the low-frequency signal 42 appears on the H side and the L side of the optical signal 31 as envelope-shaped low frequency components 32 as illustrated in the graph 30.

In the example of FIG. 4, the I/V converter 109a of the low-frequency-signal extraction circuit 109 converts the current value of the optical signal 31 that has been converted into an electric signal by the PD 105 into a voltage value. The bandpass filter 109b then extracts the low-frequency signal 42 from the optical signal 31 that has been converted into the voltage value by the I/V converter 109a. More particularly, the bandpass filter 109b filters out any high frequency components from the optical signal 31 and allows only low frequency components 32 to pass therethrough, and then calculates an average time 51 of the passed low frequency components 32 as illustrated in the graph 50, thereby extracting the low-frequency signal 42. After that, the bandpass filter 109b outputs the calculated average time 51 of the low frequency components 32 to the phase-difference detector 110 as the extracted low-frequency signal. The extracted low-frequency signal or the calculated average time 51 of the low frequency components 32 is, when no phase degradation occurs in the semiconductor MZ modulator 102, zero regardless of the passage of time.

Figure 5:
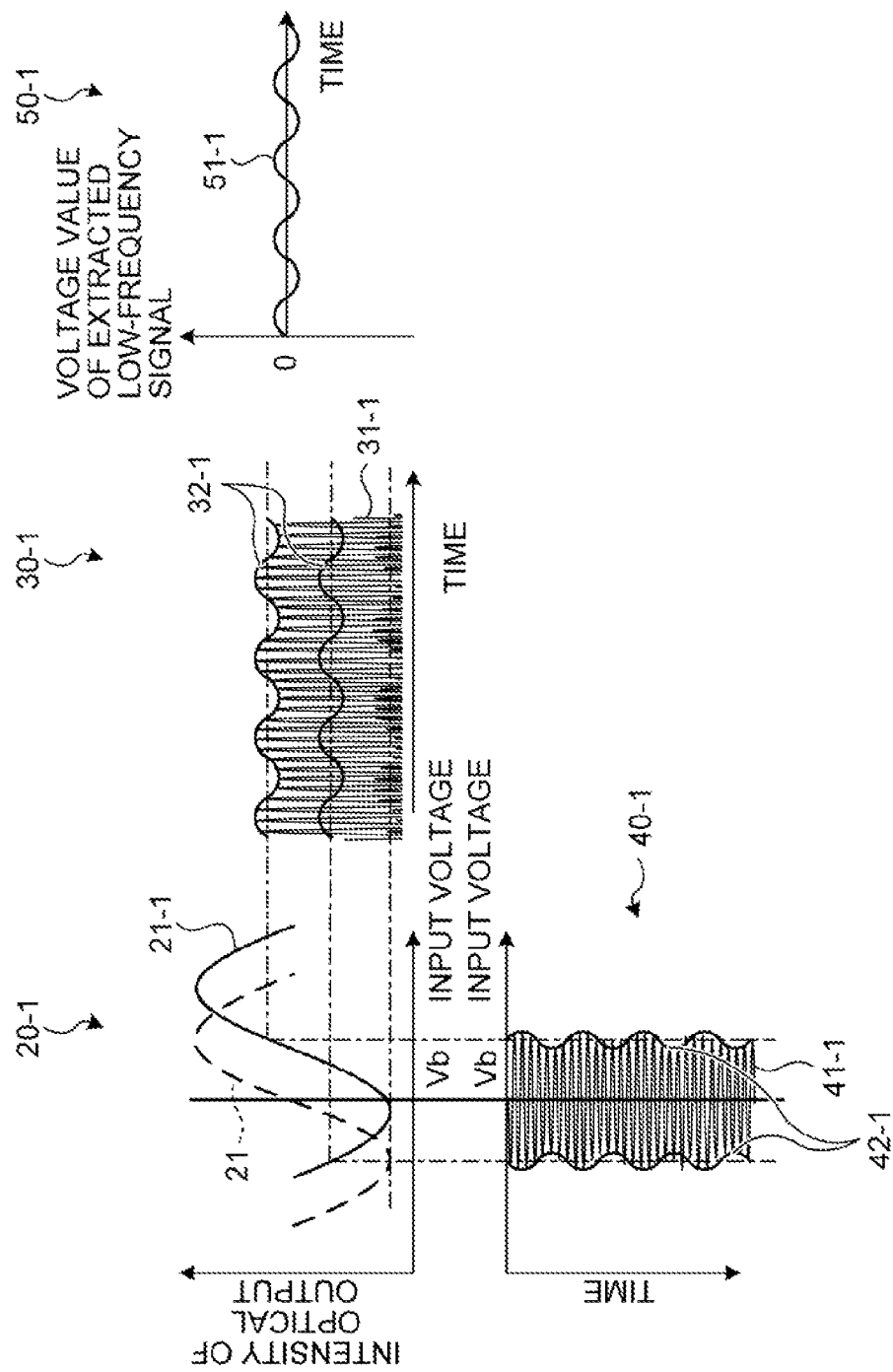
FIG. 5 is a set of graphs that illustrates the relation between a data signal that is input to the semiconductor MZ modulator and an optical signal that is output from the semiconductor MZ modulator when positive phase degradation occurs in the semiconductor MZ modulator.

The relation between a data signal that is input to the semiconductor MZ modulator 102 and an optical signal that is output from the semiconductor MZ modulator 102 is described when positive phase degradation occurs in the semiconductor MZ modulator 102. FIG. 5 is a set of graphs that illustrates the relation between a data signal that is input to the semiconductor MZ modulator 102 and an optical signal that is output from the semiconductor MZ modulator 102 when positive phase degradation occurs in the semiconductor MZ modulator 102. FIG. 5 includes graphs 20-1, 30-1, 40-1, and 50-1.

The horizontal axis of the graph 20-1 is the voltage (bias voltage) of a data signal input to the semiconductor MZ modulator 102, the vertical axis is the power of an optical signal output from the semiconductor MZ modulator 102. A curve 21-1 indicates the permeability property of the semiconductor MZ modulator 102. The horizontal axis of the graph 30-1 is the time and the vertical axis is the power of an optical signal output from the semiconductor MZ modulator 102. The horizontal axis of the graph 40-1 is the voltage (bias voltage) of a data signal input to the semiconductor MZ modulator 102, and the vertical axis is the time. The horizontal axis of the graph 50-1 is the time, and the vertical axis is the voltage value of an extracted low-frequency signal.

If positive phase degradation occurs in the semiconductor MZ modulator 102, the permeability property of the semiconductor MZ modulator 102 changes from the curve 21 of the graph 20 illustrated in FIG. 4 to the curve 21-1 of the graph 20-1. If a data signal 41-1 (data signal output from the driver 106) is input to the semiconductor MZ modulator 102 that has the permeability property indicated by the curve 21-1 of the graph 20-1, an optical signal 31-1 indicated by the graph 30-1 is output from the semiconductor MZ modulator 102. The bias voltage of the data signal 41-1 is fixed to the voltage Vb illustrated in FIG. 4. Because the data signal 41-1 contains a low-frequency signal 42-1 superposed thereon by the low-frequency-signal superposition circuit 108, the low-frequency signal 42 appears on the H side and the L side of the optical signal 31-1 as envelope-shaped low frequency components 32-1 as illustrated in the graph 30-1.

In the example of FIG. 5, the I/V converter 109a of the low-frequency-signal extraction circuit 109 converts the current value of the optical signal 31-1 that has been converted into an electric signal by the PD 105 into a voltage value. The bandpass filter 109b then extracts the low-frequency signal 42-1 from the optical signal 31-1 that has been converted into the voltage value by the I/V converter 109a. More particularly, the bandpass filter 109b filters out any high frequency components from the optical signal 31-1 and allows only low frequency components 32-1 to pass therethrough, and then calculates an average time 51-1 of the passed low frequency components 32-1 as illustrated in the graph 50-1, thereby extracting the low-frequency signal 42-1. After that, the bandpass filter 109b outputs the calculated average time 51-1 of the low frequency components 32-1 to the phase-difference detector 110 as the extracted low-frequency signal. The extracted low-frequency signal or the calculated average time 51-1 of the low frequency components 32-1 has, when positive phase degradation occurs in the semiconductor MZ modulator 102, a sinusoidal waveform.

Figure 6:
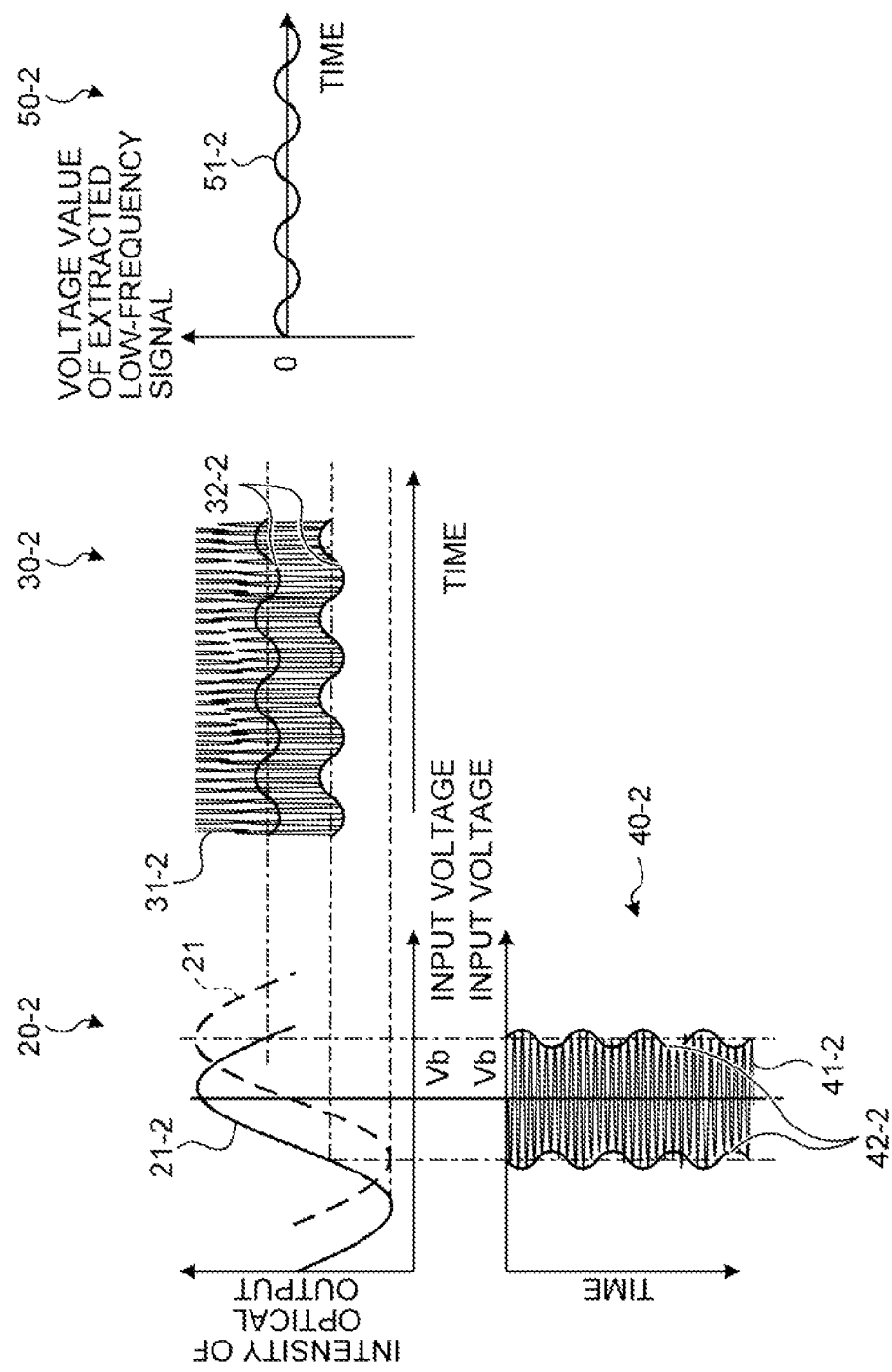
FIG. 6 is a set of graphs that illustrates the relation between a data signal that is input to the semiconductor MZ modulator and an optical signal that is output from the semiconductor MZ modulator when negative phase degradation occurs in the semiconductor MZ modulator.

The relation between a data signal that is input to the semiconductor MZ modulator 102 and an optical signal that is output from the semiconductor MZ modulator 102 is described when negative phase degradation occurs in the semiconductor MZ modulator 102. FIG. 6 is a set of graphs that illustrates the relation between a data signal that is input to the semiconductor MZ modulator 102 and an optical signal that is output from the semiconductor MZ modulator 102 when negative phase degradation occurs in the semiconductor MZ modulator 102. FIG. 6 includes graphs 20-2, 30-2, 40-2, and 50-2.

The horizontal axis of the graph 20-2 is the voltage (bias voltage) of a data signal input to the semiconductor MZ modulator 102, the vertical axis is the power of an optical signal output from the semiconductor MZ modulator 102. A curve 21-2 indicates the permeability property of the semiconductor MZ modulator 102. The horizontal axis of the graph 30-2 is the time and the vertical axis is the power of an optical signal output from the semiconductor MZ modulator 102. The horizontal axis of the graph 40-2 is the voltage (bias voltage) of a data signal input to the semiconductor MZ modulator 102, and the vertical axis is the time. The horizontal axis of the graph 50-2 is the time, and the vertical axis is the voltage value of an extracted low-frequency signal.

If negative phase degradation occurs in the semiconductor MZ modulator 102, the permeability property of the semiconductor MZ modulator 102 changes from the curve 21 of the graph 20 illustrated in FIG. 4 to the curve 21-2 of the graph 20-2. If a data signal 41-2 (data signal output from the driver 106) is input to the semiconductor MZ modulator 102 that has the permeability property indicated by the curve 21-2 of the graph 20-2, an optical signal 31-2 indicated by the graph 30-2 is output from the semiconductor MZ modulator 102. The bias voltage of the data signal 41-2 is fixed to the voltage Vb illustrated in FIG. 4. Because the data signal 41-2 contains a low-frequency signal 42-2 superposed thereon by the low-frequency-signal superposition circuit 108, the low-frequency signal 42 appears on the H side and the L side of the optical signal 31-2 as envelope-shaped low frequency components 32-2 as illustrated in the graph 30-2.

In the example of FIG. 6, the I/V converter 109a of the low-frequency-signal extraction circuit 109 converts the current value of the optical signal 31-2 that has been converted into an electric signal by the PD 105 into a voltage value. The bandpass filter 109b then extracts the low-frequency signal 42-2 from the optical signal 31-2 that has been converted into the voltage value by the I/V converter 109a. More particularly, the bandpass filter 109b filters out any high frequency components from the optical signal 31-2 and allows only low frequency components 32-2 to pass therethrough, and then calculates an average time 51-2 of the passed low frequency components 32-2 as illustrated in the graph 50-2, thereby extracting the low-frequency signal 42-2. After that, the bandpass filter 109b outputs the calculated average time 51-2 of the low frequency components 32-2 to the phase-difference detector 110 as the extracted low-frequency signal. The extracted low-frequency signal or the calculated average time 51-2 of the low frequency components 32-2 has, when negative phase degradation occurs in the semiconductor MZ modulator 102, a waveform inverted to the waveform illustrated in FIG. 5.

Referring back to FIG. 3, the phase-difference detector 110 compares the phase of an extracted low-frequency signal with the phase of a superposed low-frequency signal, thereby detecting the difference between the phase of an optical signal output from the semiconductor MZ modulator 102 and the phase of a data signal input to the semiconductor MZ modulator 102. More particularly, the phase-difference detector 110 includes a phase comparator 110a and a waveform integration circuit 110b.

The phase comparator 110a compares the phase of an extracted low-frequency signal with the phase of a superposed low-frequency signal and determines whether the signals are in-phase or anti-phase with each other. If the extracted low-frequency signal and the superposed low-frequency signal are in-phase with each other, positive phase degradation occurs in the semiconductor MZ modulator 102. If the extracted low-frequency signal and the superposed low-frequency signal are anti-phase with each other, negative phase degradation occurs in the semiconductor MZ modulator 102. The phase comparator 110a then sends a phase determination result to the waveform integration circuit 110b.

The waveform integration circuit 110b integrates, in accordance with the phase determination result received from the phase comparator 110a, the waveform of the extracted low-frequency signal. More particularly, if receiving a determination result from the phase comparator 110a indicating that the extracted low-frequency signal and the superposed low-frequency signal are in-phase with each other, the waveform integration circuit 110b sets the direction in which the waveform of the extracted low-frequency signal is integrated to negative. On the other hand, if receiving a determination result from the phase comparator 110a indicating that the extracted low-frequency signal and the superposed low-frequency signal are anti-phase with each other, the waveform integration circuit 110b sets the direction in which the waveform of the extracted low-frequency signal is integrated to positive. After that, the waveform integration circuit 110b integrates the waveform of the extracted low-frequency signal in the set integral direction. The waveform integration circuit 110b then sends, as the difference between the phase of an optical signal output from the semiconductor MZ modulator 102 and the phase of a data signal input to the semiconductor MZ modulator 102, the extracted-low-frequency-signal waveform integral value to the input-current adjustment circuit 111.

If no difference is detected between the phase of an optical signal output from the semiconductor MZ modulator 102 and the phase of a data signal input to the semiconductor MZ modulator 102, the phase-difference detector 110 sends the detection result to the input-current adjustment circuit 111. If, for example, no phase degradation is found in the semiconductor MZ modulator 102 and the extracted low-frequency signal is zero, the phase-difference detector 110 detects no difference between the phase of an optical signal output from the semiconductor MZ modulator 102 and the phase of a data signal input to the semiconductor MZ modulator 102.

The input-current adjustment circuit 111 adjusts, in accordance with phase difference detected by the phase-difference detector 110, the input current that is input to the phase shifter 103. More particularly, the input-current adjustment circuit 111 receives, from the phase-difference detector 110, an extracted-low-frequency-signal waveform integral value that is calculated as the difference between the phase of an optical signal output from the semiconductor MZ modulator 102 and the phase of a data signal input to the semiconductor MZ modulator 102 and converts the waveform integral value into a current value. The waveform integral value is converted into a current value, for example, with reference to a table that contains waveform integral values and current values in an associated manner or an equation stored in the input-current adjustment circuit 111. The input-current adjustment circuit 111 calculates the current value by using the table or the equation. The input-current adjustment circuit 111 then issues an instruction to the input-current application circuit 112 so as to update the input current to the calculated current value and apply the updated input current to the phase shifter 103.

If no difference is detected by the phase-difference detector 110 between the phase of an optical signal output from the semiconductor MZ modulator 102 and the phase of a data signal input to the semiconductor MZ modulator 102, the input-current adjustment circuit 111 maintains the input current that is input to the phase shifter 103 at the value to which the input current is currently set.

The input-current application circuit 112 applies the input current to the phase shifter 103 in accordance with the instruction received from the input-current adjustment circuit 111. The phase shifter 103 then compensates the phase of a signal light output from the second waveguide 102b in accordance with the input current.

Figure 7:
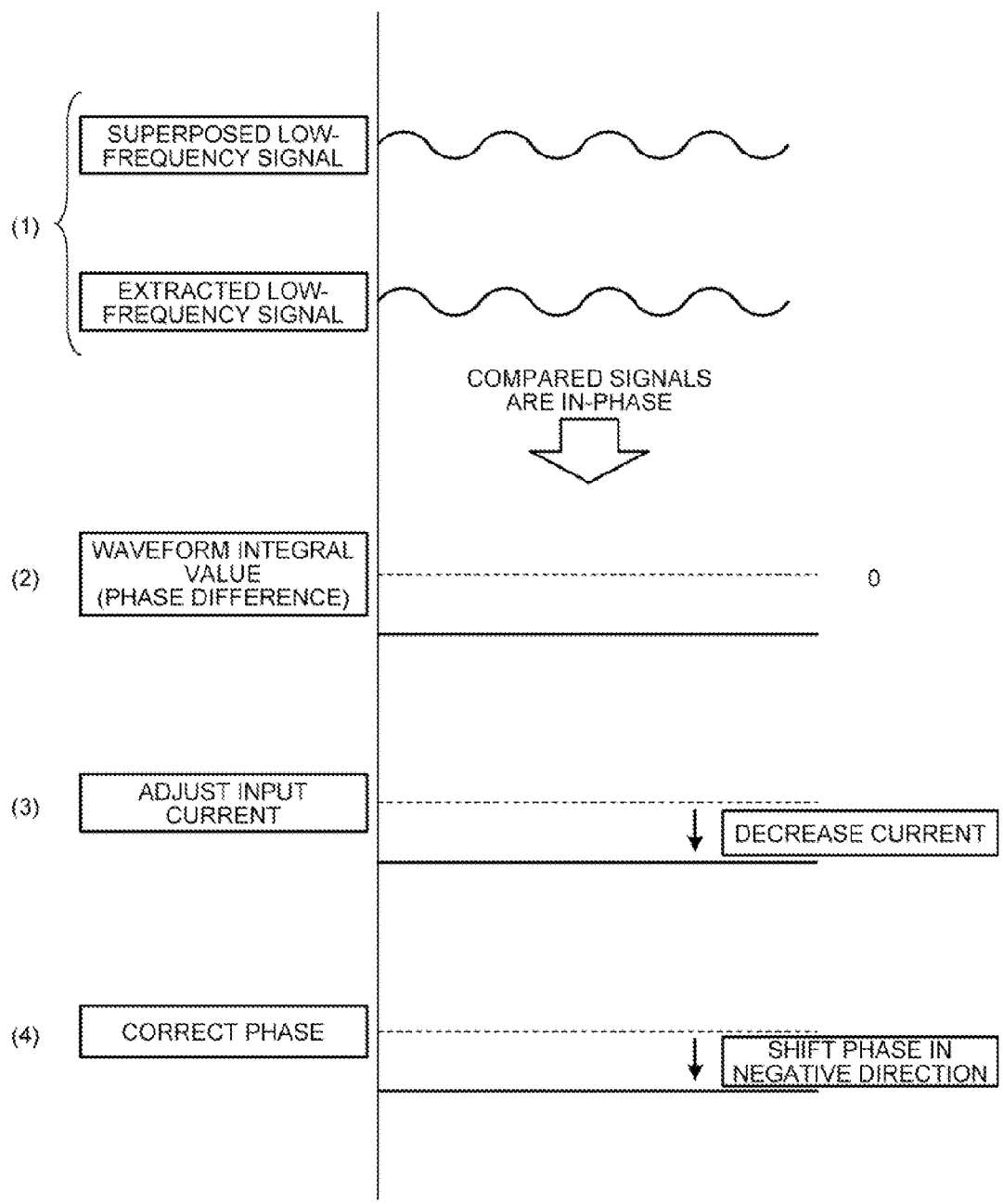
FIG. 7 is a schematic diagram of a general process in which the optical modulator adjusts the input current that is input to the phase shifter when positive phase degradation occurs in the semiconductor MZ modulator.

The general process in which the optical modulator 100 adjusts the input current that is input to the phase shifter 103 is described. FIG. 7 is a schematic diagram of the general process in which the optical modulator 100 adjusts the input current that is input to the phase shifter 103 when positive phase degradation occurs in the semiconductor MZ modulator 102.

Because positive phase degradation occurs in the semiconductor MZ modulator 102, the phase comparator 110a of the phase-difference detector 110 determines that the extracted low-frequency signal and the superposed low-frequency signal are in-phase with each other (see (1) of FIG. 7). The phase comparator 110a sends a determination result to the waveform integration circuit 110b indicating that the extracted low-frequency signal and the superposed low-frequency signal are in-phase with each other.

Upon receiving, from the phase comparator 110a, the determination result indicating that the extracted low-frequency signal and the superposed low-frequency signal are in-phase with each other, the waveform integration circuit 110b sets the direction in which the waveform of the extracted low-frequency signal is integrated to negative and then integrates the waveform of the extracted low-frequency signal (see (2) of FIG. 7). The waveform integration circuit 110b sends, as the difference between the phase of an optical signal output from the semiconductor MZ modulator 102 and the phase of a data signal input to the semiconductor MZ modulator 102, the extracted-low-frequency-signal waveform integral value to the input-current adjustment circuit 111. Because the direction in which the waveform of the extracted low-frequency signal is integrated is set to negative, the sign of the extracted-low-frequency-signal waveform integral value that is sent to the input-current adjustment circuit 111 is negative.

After that, the input-current adjustment circuit 111 converts the extracted-low-frequency-signal waveform integral value that is received from the phase-difference detector 110 into a current value and then issues an instruction to the input-current application circuit 112 so as to update the input current to the calculated current value and apply the updated input current to the phase shifter 103. Because, in this example, the sign of the extracted-low-frequency-signal waveform integral value that is sent to the input-current adjustment circuit 111 is negative, an instruction is issued to the input-current application circuit 112 so as to decrease the input current that is input to the phase shifter 103 to a value lower than the currently set value. The input-current application circuit 112 decreases the input current that is input to the phase shifter 103 in accordance with the instruction received from the input-current adjustment circuit 111 (see (3) of FIG. 7).

The phase shifter 103 then shifts, in accordance with the input current received from the input-current application circuit 112, the phase of a signal light output from the second waveguide 102b by an amount that corresponds to the phase degradation of the semiconductor MZ modulator 102, thereby compensating the phase of a signal light output from the second waveguide 102b. In this example, the phase shifter 103 shifts the phase of a signal light output from the second waveguide 102b in the negative direction by the amount to offset the positive phase degradation occurring in the semiconductor MZ modulator 102, thereby compensating the phase of a signal light output from the second waveguide 102b (see (4) of FIG. 7).

Figure 8:
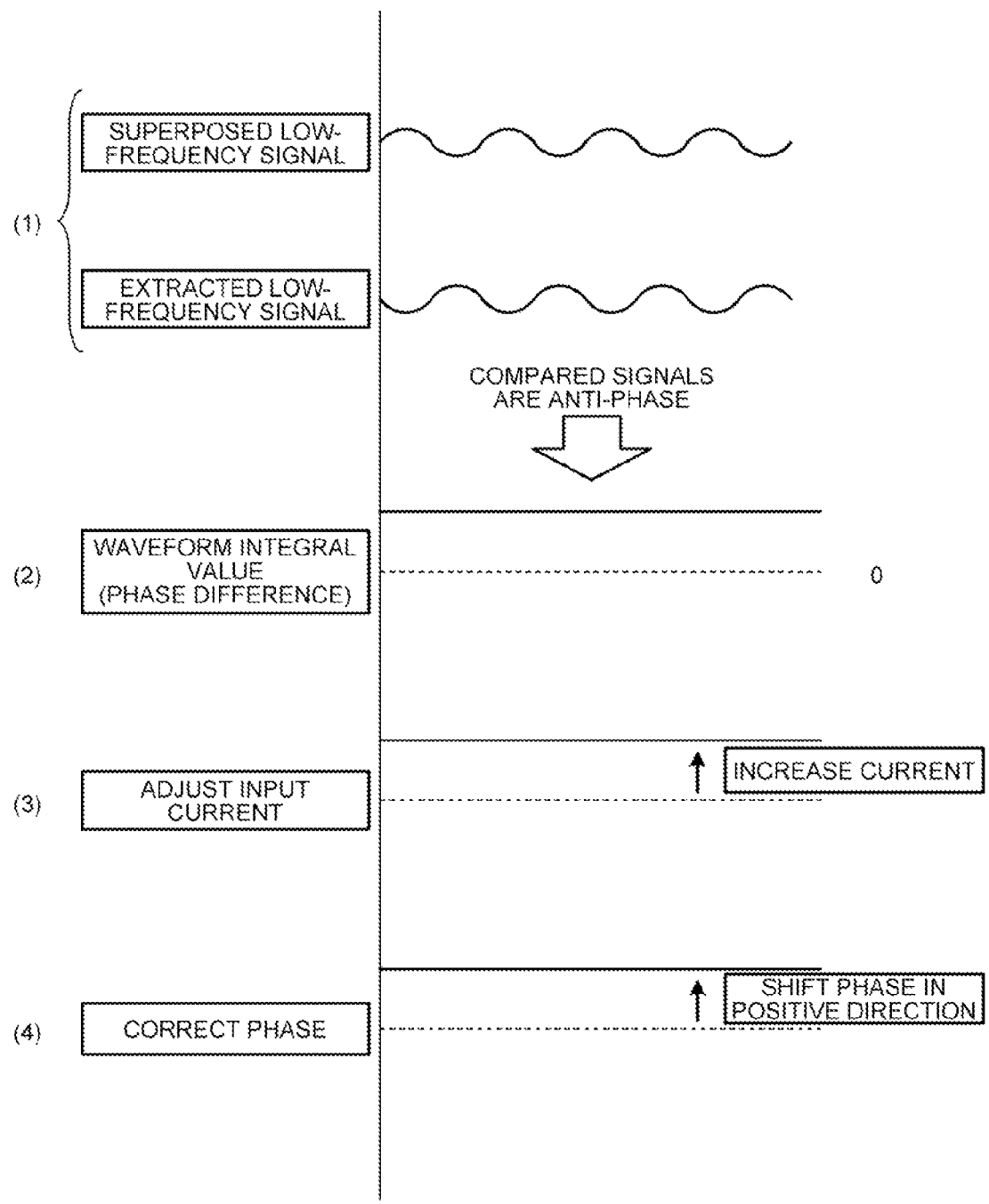
FIG. 8 is a schematic diagram of a general process in which the optical modulator adjusts the input current that is input to the phase shifter when negative phase degradation occurs in the semiconductor MZ modulator.

FIG. 8 is a schematic diagram of the general process in which the optical modulator 100 adjusts the input current that is input to the phase shifter 103 when negative phase degradation occurs in the semiconductor MZ modulator 102.

Because negative phase degradation occurs in the semiconductor MZ modulator 102, the phase comparator 110a of the phase-difference detector 110 determines that the extracted low-frequency signal is anti-phase with the superposed low-frequency signal (see (1) of FIG. 8). The phase comparator 110a sends a determination result to the waveform integration circuit 110b indicating that the extracted low-frequency signal and the superposed low-frequency signal are anti-phase with each other.

Upon receiving, from the phase comparator 110a, the determination result indicating that the extracted low-frequency signal and the superposed low-frequency signal are anti-phase with each other, the waveform integration circuit 110b sets the direction in which the waveform of the extracted low-frequency signal is integrated to positive and then integrates the waveform of the extracted low-frequency signal (see (2) of FIG. 8). The waveform integration circuit 110b sends, as the difference between the phase of an optical signal output from the semiconductor MZ modulator 102 and the phase of a data signal input to the semiconductor MZ modulator 102, the extracted-low-frequency-signal waveform integral value to the input-current adjustment circuit 111. Because the direction in which the waveform of the extracted low-frequency signal is integrated is set to positive, the sign of the extracted-low-frequency-signal waveform integral value that is sent to the input-current adjustment circuit 111 is positive.

After that, the input-current adjustment circuit 111 converts the extracted-low-frequency-signal waveform integral value that is received from the phase-difference detector 110 into a current value and then issues an instruction to the input-current application circuit 112 so as to update the input current to the calculated current value and apply the updated input current to the phase shifter 103. Because, in this example, the sign of the extracted-low-frequency-signal waveform integral value that is sent to the input-current adjustment circuit 111 is positive, an instruction is issued to the input-current application circuit 112 so as to increase the input current that is input to the phase shifter 103 to a value higher than the currently set value. The input-current application circuit 112 decreases the input current that is input to the phase shifter 103 in accordance with the instruction received from the input-current adjustment circuit 111 (see (3) of FIG. 8).

The phase shifter 103 then shifts, in accordance with the input current received from the input-current application circuit 112, the phase of a signal light output from the second waveguide 102b by an amount that corresponds to the phase degradation of the semiconductor MZ modulator 102, thereby compensating the phase of a signal light output from the second waveguide 102b. In this example, the phase shifter 103 shifts the phase of a signal light output from the second waveguide 102b in the positive direction by the amount to offset the negative phase degradation occurring in the semiconductor MZ modulator 102, thereby compensating the phase of a signal light output from the second waveguide 102b (see (4) of FIG. 8).

Figure 9:
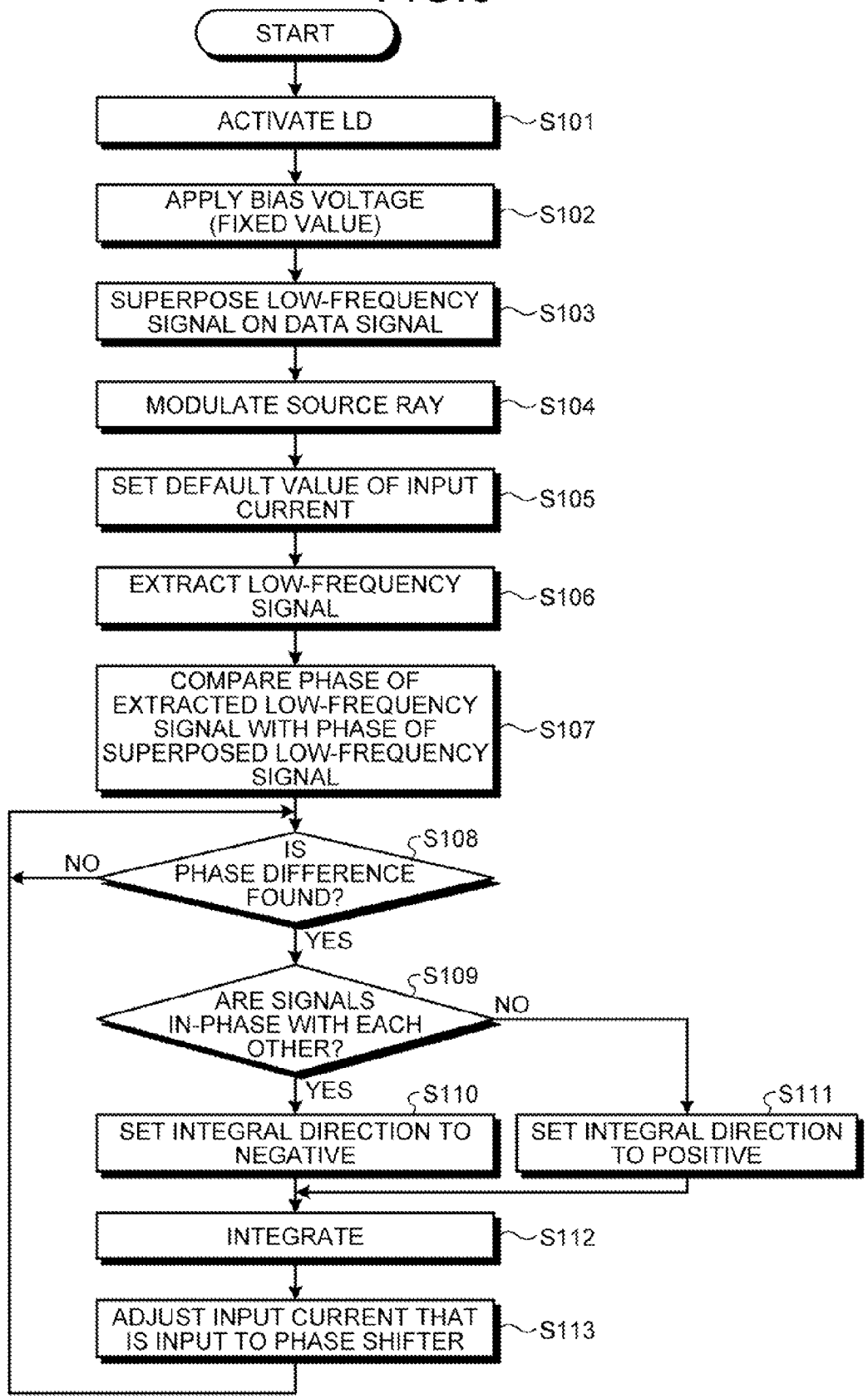
FIG. 9 is a flowchart of an optical modulating process according to the first embodiment.

A process performed by the optical modulator 100 is described according to the first embodiment. FIG. 9 is a flowchart of an optical modulating process performed by the optical modulator 100 according to the first embodiment. As illustrated in FIG. 9, when the optical modulator 100 is powered on, the activated LD 101 emits light (Operation S101).

The bias-voltage application circuit 107 applies a bias voltage to a data signal that is output from the driver 106, the applied bias voltage having the bias point fixed to a predetermined value (Operation S102). After that, the low-frequency-signal superposition circuit 108 generates a low-frequency signal and superposes the generated low-frequency signal on the data signal that is output from the driver 106 (Operation S103).

The semiconductor MZ modulator 102 then modulates the intensity of light emitted from the LD 101 (Operation S104). More particularly, the source light is input to the semiconductor MZ modulator 102 and then split into two lights: a first light of source light is output to the first waveguide 102a and a second light of source light is output to the second waveguide 102b. The first waveguide 102a superposes a data signal that is output from the driver 106 on the first light of source light, thereby modulating the first light of source light. The second waveguide 102b superposes a data signal that is output from the driver 106 on the second light of source light, thereby modulating the second light of source light. After that, a signal light that is output from the first waveguide 102a is combined with a signal light that is output the second waveguide 102b and then output from the phase shifter 103 and, thus, an intensity-modulated optical signal is generated. Because a data signal output from the driver 106 contains a low-frequency signal superposed thereon by the low-frequency-signal superposition circuit 108, the low-frequency signal appears on the H side and the L side of the optical signal as envelope-shaped low frequency components.

After that, the input-current adjustment circuit 111 sets the default value of the input current that is input to the phase shifter 103 (Operation S105). For example, the input-current adjustment circuit 111 sets the input-current application circuit 112 to have a default current of the input current that is input to the phase shifter 103 such that the phase-difference detector 110 detects no difference between the phase of an optical signal that is output from the semiconductor MZ modulator 102 and a data signal that is input to the semiconductor MZ modulator 102. The phase shifter 103 compensates the phase of a signal light output from the second waveguide 102b in accordance with the input current that is received from the input-current application circuit 112.

After that, the low-frequency-signal extraction circuit 109 extracts a low-frequency signal from an electric signal detected by the PD 105 (Operation S106). The phase comparator 110a of the phase-difference detector 110 then compares the phase of the extracted low-frequency signal with the phase of the superposed low-frequency signal and determines whether the signals are in-phase or anti-phase with each other (Operation S107). If no phase degradation is found in the semiconductor MZ modulator 102 and the extracted low-frequency signal is zero, the phase-difference detector 110 detects no difference between the phase of an optical signal that is output from the semiconductor MZ modulator 102 and the phase of a data signal that is input to the semiconductor MZ modulator 102 (No at Operation S108) and sends the determination result to the input-current adjustment circuit 111. Upon receiving the determination result indicating that no difference is detected between the phase of an optical signal that is output from the semiconductor MZ modulator 102 and the phase of a data signal that is input to the semiconductor MZ modulator 102, the input-current adjustment circuit 111 maintains the input current that is input to the phase shifter 103 at the value to which the input current is currently set value and the process control returns to Operation S108. On the other hand, if any phase degradation occurs in the semiconductor MZ modulator 102 and the low-frequency signal is a value other than zero (Yes at Operation S108), the phase-difference detector 110 causes the process control to go to Operation S109.

After that, if receiving, from the phase comparator 110a, a determination result indicating that the extracted low-frequency signal and the superposed low-frequency signal are in-phase with each other (Yes at Operation S109), the waveform integration circuit 110b of the phase-difference detector 110 sets the direction in which the waveform of the extracted low-frequency signal is integrated to negative (Operation S110). On the other hand, if receiving, from the phase comparator 110a, a determination result indicating that the extracted low-frequency signal and the superposed low-frequency signal are anti-phase with each other (No at Operation S109), the waveform integration circuit 110b sets the direction in which the waveform of the extracted low-frequency signal is integrated to positive (Operation S111). After that, the waveform integration circuit 110b integrates the waveform of the extracted low-frequency signal in the set integral direction (Operation S112). The waveform integration circuit 110b then sends, as the difference between the phase of an optical signal output from the semiconductor MZ modulator 102 and the phase of a data signal input to the semiconductor MZ modulator 102, the extracted-low-frequency-signal waveform integral value to the input-current adjustment circuit 111.

The input-current adjustment circuit 111 adjusts, in accordance with the phase difference detected by the phase-difference detector 110, the input current that is input to the phase shifter 103 (Operation S113), and the process control returns to Operation S108. More particularly, the input-current adjustment circuit 111 receives, from the phase-difference detector 110, the extracted-low-frequency-signal waveform integral value that is calculated as the difference between the phase of an optical signal output from the semiconductor MZ modulator 102 and the phase of a data signal input to the semiconductor MZ modulator 102 and converts the received waveform integral value into a current value. The input-current adjustment circuit 111 then issues an instruction to the input-current application circuit 112 so as to update the input current to the calculated current value and apply the updated input current to the phase shifter 103. The process control then returns to Operation S108.

As described above, the optical modulator 100 according to the first embodiment compensates the phase of a signal light by using the phase shifter 103. The optical modulator 100 then detects the difference between an optical signal output from the semiconductor MZ modulator 102 and a data signal input to the semiconductor MZ modulator 102. The optical modulator 100 then adjusts, in accordance with the detected phase difference, the input current that is input to the phase shifter 103. With this configuration, the optical modulator 100 can compensate phase degradation without causing the semiconductor MZ modulator 102 to increase or decrease the bias voltage applied by the bias-voltage application circuit 107. As a result, the optical modulator 100 can prevent an increase in the absorption of the semiconductor MZ modulator 102 caused by an increase or a decrease in the bias voltage, which in turn reduces any decrease in the power of the optical signal output from the semiconductor MZ modulator 102.

The optical modulator 100 according to the first embodiment compares the phase of an extracted low-frequency signal with the phase of a superposed low-frequency signal, thereby detecting the difference between an optical signal output from the semiconductor MZ modulator 102 and a data signal input to the semiconductor MZ modulator 102. With this configuration, the optical modulator 100 can use the conventional technology that enables detecting, using a low-frequency signal, the difference between the phase of an optical signal and the phase of a data signal, which simplifies the processes.

If no difference is detected between the phase of an optical signal output from the semiconductor MZ modulator 102 and the phase of a data signal input to the semiconductor MZ modulator 102, the optical modulator 100 according to the first embodiment maintains (holds) the input current that is input to the phase shifter 103. Therefore, when no phase degradation occurs in the semiconductor MZ modulator 102, the optical modulator 100 saves the unnecessary consumed power used in the input-current adjustment process.

[b] Second Embodiment

According to the first embodiment, the phase shifter 103 is included in the second waveguide 102b of the semiconductor MZ modulator 102. It is allowable to configure both the first waveguide 102a and the second waveguide 102b of the semiconductor MZ modulator 102 include phase shifters, respectively. In the second embodiment, both the first waveguide 102a and the second waveguide 102b of the semiconductor MZ modulator 102 include phase shifters, respectively.

Figure 10:
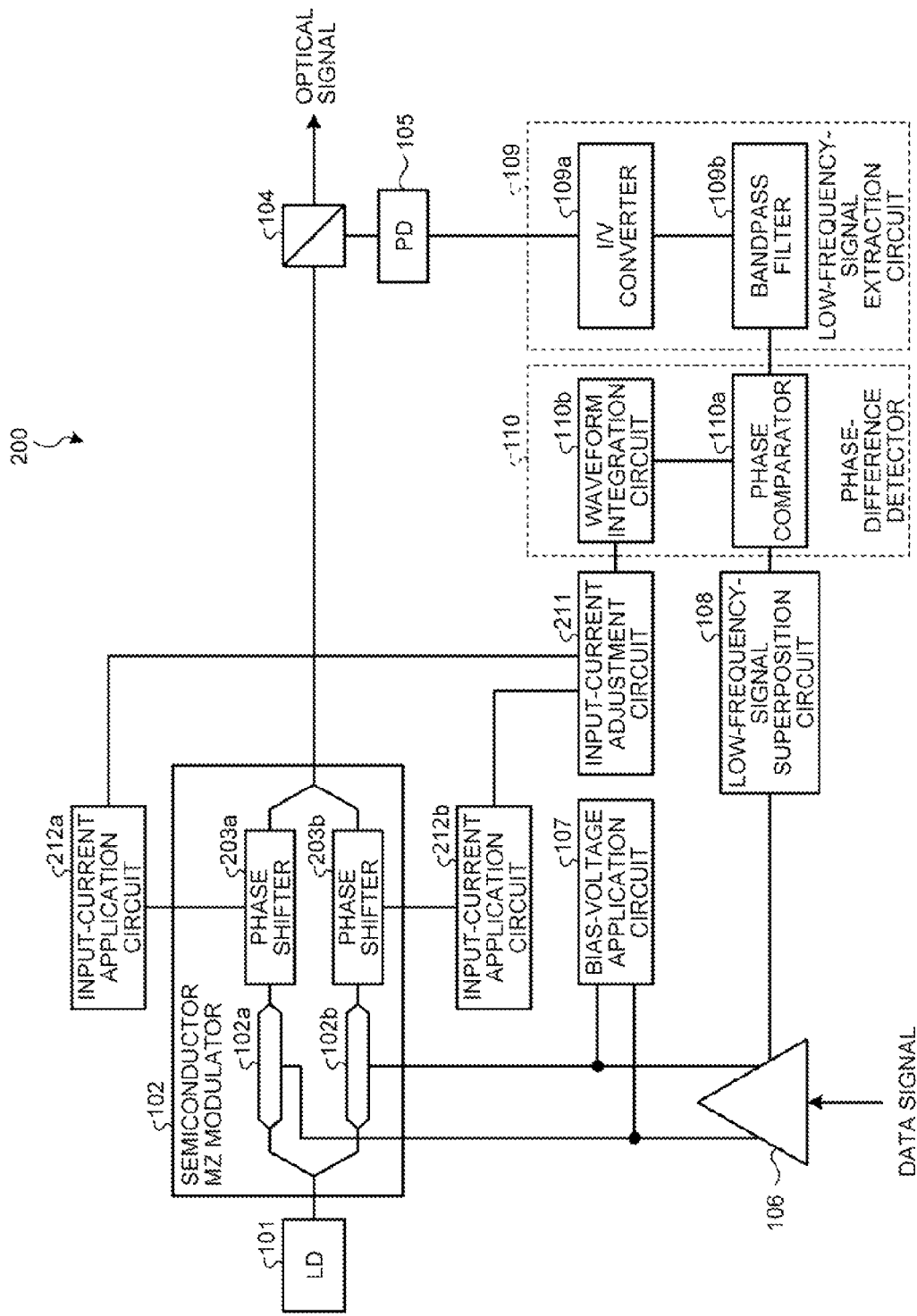
FIG. 10 is a block diagram of an optical modulator according to the second embodiment.

FIG. 10 is a block diagram of an optical modulator 200 according to the second embodiment. The same components illustrated in FIG. 10 as those illustrated in FIG. 3 are denoted with the same reference numerals and the same description is not repeated. As illustrated in FIG. 10, in the optical modulator 200, the first waveguide 102a and the second waveguide 102b of the semiconductor MZ modulator 102 have phase shifters 203a and 203b, respectively. The optical modulator 200 includes, instead of the input-current adjustment circuit 111 and the input-current application circuit 112 illustrated in FIG. 3, an input-current adjustment circuit 211 and input-current application circuits 212a and 212b, respectively.

The phase shifter 203a compensates the phase of a signal light in accordance with an input current that is received from the input-current application circuit 212a; the phase shifter 203b compensates the phase of a signal light in accordance with an input current that is received from the input-current application circuit 212b. More particularly, each of the phase shifters 203a and 203b contains a material whose refractive index varies depending on the input current. The phase shifter 203a shifts the phase of a signal light output from the first waveguide 102a by using a change in the refractive index that varies according to a change in the input current received from the input-current application circuit 212a, thereby compensating the phase of a signal light. The phase shifter 203b shifts the phase of a signal light output from the second waveguide 102b by using a change in the refractive index that varies according to a change in the input current received from the input-current application circuit 212b, thereby compensating the phase of a signal light. For example, each of the phase shifters 203a and 203b shifts, in accordance with the input current received from the input-current application circuit 212a or 212b, the phase of a signal light by the amount that corresponds to phase degradation of the semiconductor MZ modulator 102, thereby compensating the phase of the signal light. The amount of shifting the phase of a signal light by each of the phase shifters 203a and 203b is equal to the half of the amount of shifting the phase of a signal light by the phase shifter 103 of FIG. 3. The phase shifters 203a and 203b are examples of the compensation circuit.

The input-current adjustment circuit 211 adjusts, in accordance with the phase difference detected by the phase-difference detector 110, the input currents that are input to the phase shifters 203a and 203b, respectively. The amount of adjusting the respective input currents by the input-current adjustment circuit 211 is equal to the half of the amount of adjusting the input current by the input-current adjustment circuit 111 of FIG. 3. The input-current application circuits 212a and 212b apply, in accordance with an instruction received from the input-current adjustment circuit 211, the input currents to the phase shifters 203a and 203b, respectively. Thus, the phase shifters 203a and 203b compensate the phases of the signal lights in accordance with the input currents.

As described above, in the optical modulator 200 according to the second embodiment, the first waveguide 102a and the second waveguide 102b of the semiconductor MZ modulator 102 have the phase shifters 203a and 203b, respectively. The optical modulator 200 then compensates the phase of a signal light output from the first waveguide 102a and the phase of a signal light output from the second waveguide 102b by using the two phase shifters 203a and 203b, respectively. With this configuration, in the optical modulator 200, the amount of shifting the phase of a signal light by each of the phase shifters 203a and 203b decreases to the half of the amount of shifting the phase of a signal light by the single phase shifter, which decreases the load on each of the phase shifters 203a and 203b. As a result, the progress of temporal deterioration of the phase shifters 203a and 203b slows down.

[c] Third Embodiment

According to the first embodiment, the semiconductor MZ modulator 102 has only one waveguide group that includes the first waveguide 102a and the second waveguide 102b. However, the semiconductor MZ modulator 102 can be a differential quadrature phase shift keying (DQPSK) modulator that includes a pair of waveguide groups, each having the first waveguide 102a and the second waveguide 102b. If the semiconductor MZ modulator 102 is a DQPSK modulator, a phase shifter can perform a phase shift in such a manner that the phase of one waveguide group differs by π/2 from the phase of the other waveguide group. In the third embodiment, an example is explained in which a DQPSK modulator includes a pair of waveguide groups and a phase shifter can perform a phase shift in such a manner that the phase of one waveguide group differs by π/2 from the phase of the other waveguide group.

Figure 11:
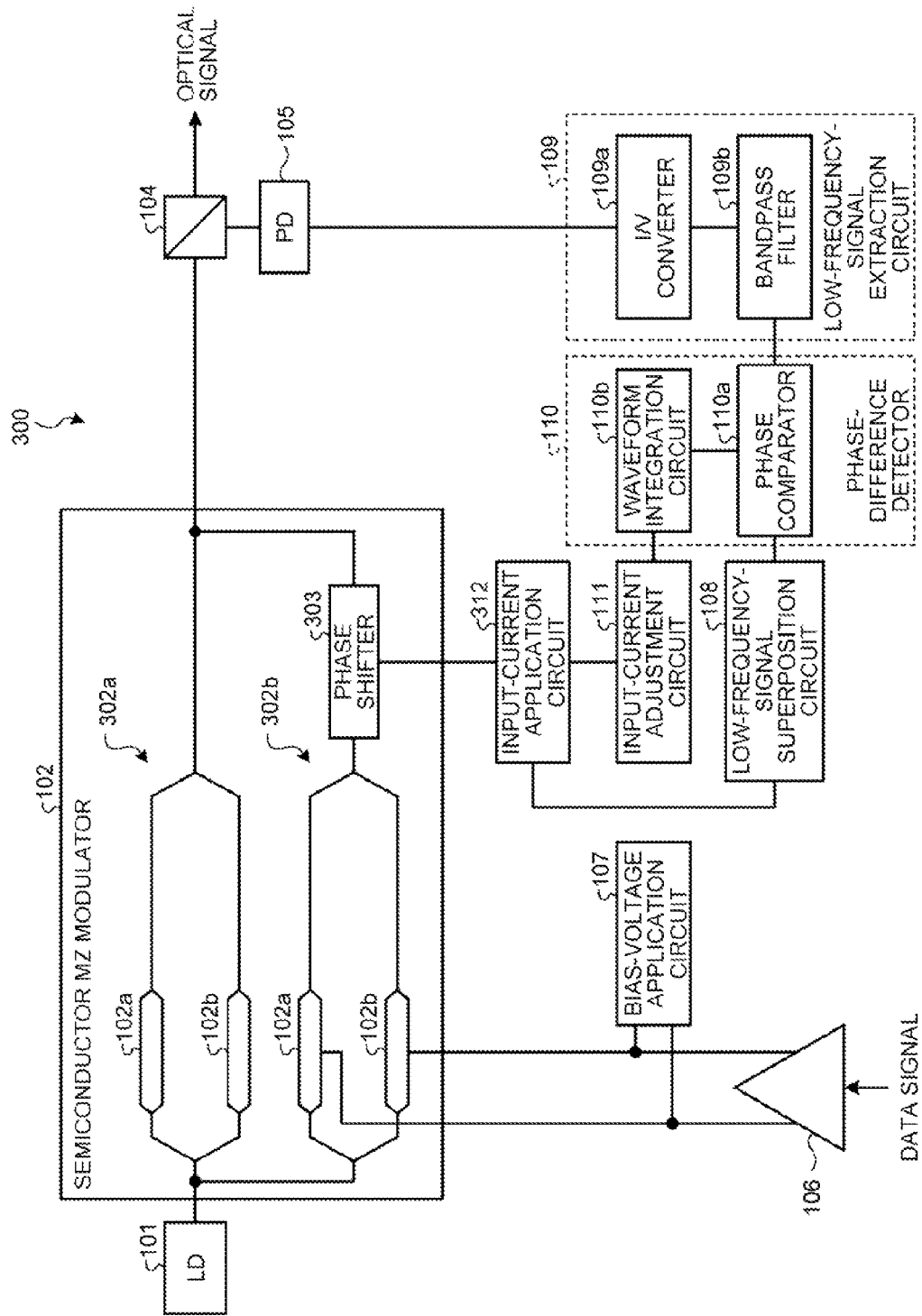
FIG. 11 is a block diagram of the configuration of an optical modulator according to the third embodiment.

FIG. 11 is a block diagram of the configuration of an optical modulator 300 according to the third embodiment. The same components illustrated in FIG. 11 as those illustrated in FIG. 3 are denoted with the same reference numerals and the same description is not repeated. As illustrated in FIG. 11, the semiconductor MZ modulator 102 included in the optical modulator 300 is a DQPSK modulator that includes a pair of waveguide groups 302a and 302b, each having the first waveguide 102a and the second waveguide 102b. A phase shifter 303 is arranged at the output side of the waveguide group 302b. For the sake of simplicity, part of the bias-voltage application circuit and the driver is not illustrated in FIG. 11.

The phase shifter 303 shifts the phase of a signal light output from the waveguide group 302b by π/2 with respect to the phase of a signal light output from the waveguide group 302a. The phase shifter 303 shifts the phase of a signal light output from the waveguide group 302b in accordance with the input current received from an input-current application circuit 312. The phase shifter 303 is the same as the phase shifter 103 illustrated in FIG. 3. The phase shifter 303 contains a material whose refractive index varies depending on the input current and shifts the phase of a signal light that is output from the waveguide group 302b by using a change in the refractive index that varies according to a change in the input current received from the input-current application circuit 312.

As described above, in the optical modulator 300 according to the third embodiment, the DQPSK semiconductor MZ modulator 102 includes the waveguide groups 302a and 302b and the phase shifter 303 performs a phase shift in such a manner that the phase of the waveguide group 302a differs by π/2 from the phase of the waveguide group 302b. Therefore, the optical modulator 300 can set the phase difference between the waveguide groups 302a and 302b to the target value π/2, without increasing or decreasing the bias voltage that is applied to the semiconductor MZ modulator 102. As a result, the optical modulator 300 can prevent an increase in the absorption of the semiconductor MZ modulator 102 caused by an increase or a decrease in the bias voltage and can maintain the phase difference between the waveguide groups 302a and 302b at a target value.

[d] Fourth Embodiment

According to the third embodiment, a DQPSK modulator includes a pair of waveguide groups and a phase shifter performs a phase shift in such a manner that the phase of one waveguide group differs by π/2 from the phase of the other waveguide group. It is allowable to not only perform a phase shift, by using a phase shifter, in such a manner that the phase of one waveguide group differs by π/2 from the phase of the other waveguide group but also compensate phase degradation in the same manner as in the first embodiment.

Figure 12:
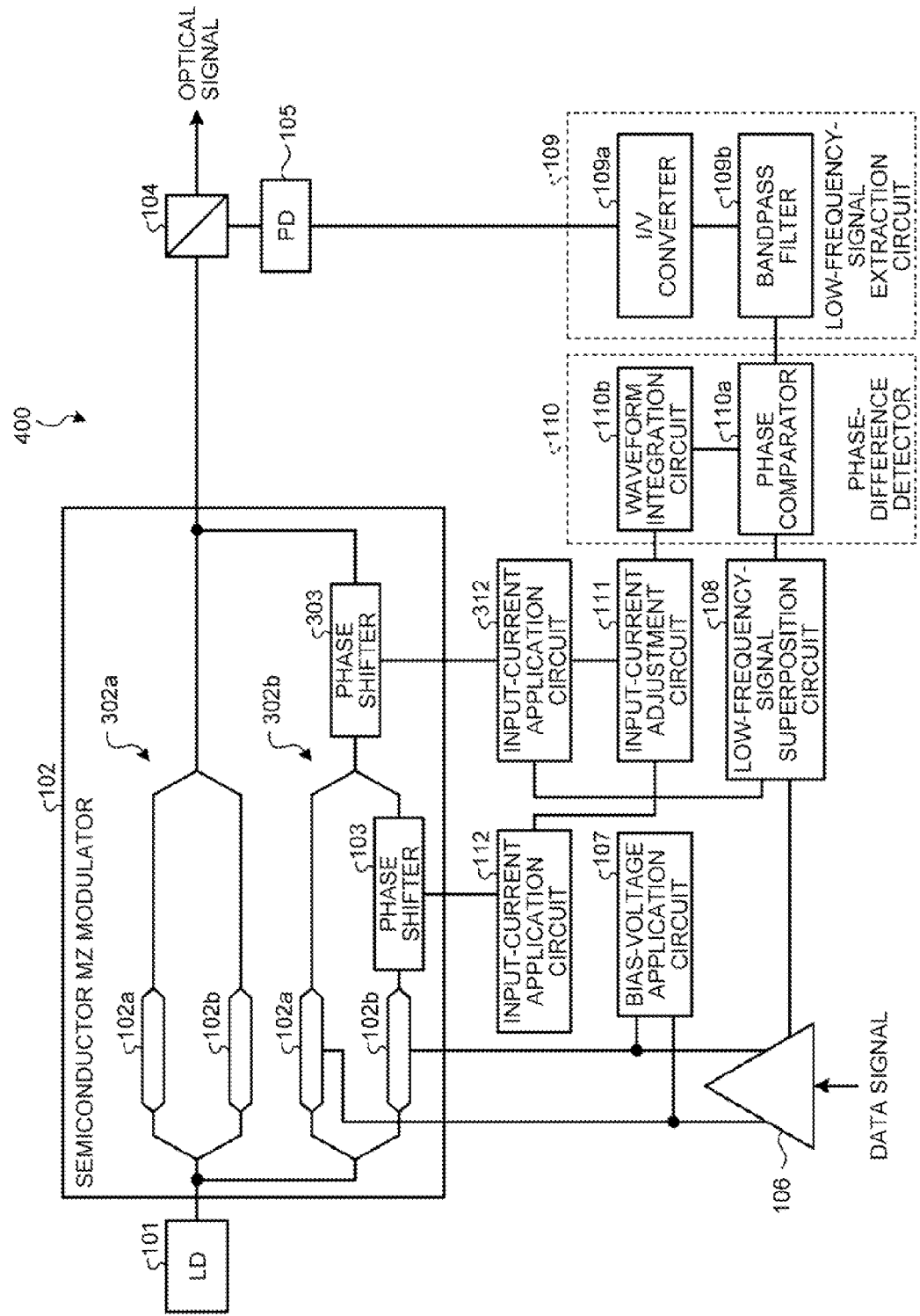
FIG. 12 is a block diagram of the configuration of an optical modulator according to the fourth embodiment.

FIG. 12 is a block diagram of the configuration of an optical modulator 400 according to the fourth embodiment. The same components illustrated in FIG. 12 as those illustrated in FIGS. 3 and 11 are denoted with the same reference numerals and the same description is not repeated. In the optical modulator 400 as illustrated in FIG. 12, the phase shifter 303 that is illustrated in FIG. 11 is arranged at the output side of the waveguide group 302b included in the semiconductor MZ modulator 102. The phase shifter 103 that is illustrated in FIG. 3 is arranged at the output side of the second waveguide 102b of the waveguide group 302b.

With this configuration, in the optical modulator 400 according to the fourth embodiment, the phase shifter 303 perform a phase shift in such a manner that the phase of one waveguide group differs by $\pi/2$ from the phase of the other waveguide group, while the phase shifter 103 compensates phase degradation in the same manner as in the first embodiment. As a result, the optical modulator 400 can prevent an increase in the absorption of the semiconductor MZ modulator 102 caused by an increase or a decrease in the bias voltage and can maintain the phase difference between the waveguide groups 302a and 302b at a target value. Moreover, the decrease in the power of the optical signal output from the semiconductor MZ modulator 102 is reduced.

According to an aspect of an optical modulator of the present invention, even if a modulator is made of a semiconductor, the decrease in the power of the optical signal output from the modulator is reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulator comprising:
    a modulator that modulates an input light using an input signal to which a bias voltage fixed to a predetermined value is applied;
    a compensation circuit that compensates a phase of a signal light in accordance with an input current, the signal light being the input light modulated by the modulator;
    a detector that detects a difference between the phase of the signal light compensated by the compensation circuit and a phase of the input signal that is input to the modulator; and
    an adjustment circuit that adjusts, in accordance with the phase difference detected by the detector, the input current that is input to the compensation circuit, while keeping the bias voltage fixed to the predetermined value.

2. The optical modulator according to claim 1, further comprising
    a superposition circuit that superposes a low-frequency signal on an input signal that is input to the modulator; and
    an extraction circuit that extracts the low-frequency signal from the signal light that is compensated by the compensation circuit, wherein
    the detector detects the phase difference by comparing a phase of the low-frequency signal that is extracted by the extraction circuit from the signal light with a phase of the low-frequency signal that is superposed by the superposition circuit on the input signal.

3. The optical modulator according to claim 1, wherein, when no phase difference is detected by the detector, the adjustment circuit does not change the input current that is input to the compensation circuit.

4. The optical modulator according to claim 1, wherein the modulator includes
    an optical splitter that splits the input light into a first input light and a second input light;
    a first waveguide that guides the first input light and modulates the first input light by superposing an input signal on the first input light, thereby generating a first signal light;
    a second waveguide that guides the second input light and modulates the second input light by superposing an input signal on the second input light, thereby generating a second signal light; and
    a optical combiner that combines the first signal light with the second signal light, and
    the compensation circuit is arranged on either or both of the first waveguide and the second waveguide.

5. The optical modulator according to claim 4, wherein the modulator is a DQPSK modulator that includes a pair of a first waveguide group and a second waveguide group, each group having the first waveguide and the second waveguide, and
    the compensation circuit is a phase shifter that performs a phase shift in such a manner that a phase of the first waveguide group differs by Th/2 from a phase of the second waveguide group.

6. An optical modulating method comprising:
    modulating, by a modulator, an input light by using an input signal that is input to the modulator and to which a bias voltage fixed to a predetermined value is applied;
    compensating, by a compensation circuit, a phase of a signal light in accordance with an input current that is input to the compensation circuit, the signal light being the modulated input light;
    detecting a difference between the phase of the phase-compensated signal light and a phase of the input signal that is input to the modulator; and
    adjusting, in accordance with the detected phase difference, the input current that is input to the compensation circuit, while keeping the bias voltage fixed to the predetermined value.

* * * * *